United States Patent [19]
Harkrader et al.

[11] Patent Number: 6,056,297
[45] Date of Patent: May 2, 2000

[54] INTERMEDIATE SHAFT DASH PANEL SEAL

[75] Inventors: Ronald Lee Harkrader, Clarkston; Richard E. Jayroe, Rochester Hills; Lawrence A. Staat, Royal Oak, all of Mich.

[73] Assignee: General Motors Corporation, Detroit, Mich.

[21] Appl. No.: 09/066,497

[22] Filed: Apr. 24, 1998

[51] Int. Cl.[7] ........................................ F16J 3/00
[52] U.S. Cl. .................. 277/634; 277/636; 277/637; 277/654; 403/50
[58] Field of Search .................... 277/634, 635, 277/636, 637, 640, 650, 651, 654; 280/777; 74/492; 403/50, 51

[56] References Cited

U.S. PATENT DOCUMENTS

| | | | |
|---|---|---|---|
| Re. 33,701 | 9/1991 | Triquet | 464/173 |
| 1,885,121 | 11/1932 | Loweke | 137/493.2 |
| 3,373,629 | 3/1968 | Wight et al. | 74/492 |
| 3,381,987 | 5/1968 | Husen | 403/51 |
| 3,683,421 | 8/1972 | Martinie | 3/1 |
| 3,842,621 | 10/1974 | Mazziotti | 64/32 F |
| 4,817,968 | 4/1989 | Fischle | 277/636 |
| 4,826,466 | 5/1989 | Triquet | 464/173 |
| 4,840,386 | 6/1989 | Peitsmeier et al. | 277/636 |
| 5,669,718 | 9/1997 | Sakairi et al. | 384/220 |
| 5,813,288 | 9/1998 | Simonette | 74/492 |

*Primary Examiner*—Anthony Knight
*Assistant Examiner*—Alison K. Pickard
*Attorney, Agent, or Firm*—Jeffrey A. Sedlar; Kathryn A. Marra

[57] ABSTRACT

An intermediate shaft seal for installation at an opening in a dash panel of a vehicle remove extra space includes an inner shell, an overmold and a bushing assembly. The bushing assembly includes a pair of bushings and is disposed within the inner shell to rotatably support an intermediate shaft of a steering column of a vehicle. The inner shell includes a rigid base plate and sealing ridges for mounting against a dash panel of a vehicle and providing a seal against water, fumes and dirt intrusion. The overmold engages locking features on the inner shell and forms air gaps therebetween cooperating with the sealing ridges and bushings to establish a sound attenuating structure. The inner shell and the overmold include cooperating sinuous shaped sections allowing angular flexibility of the seal for installation in various model vehicles.

15 Claims, 4 Drawing Sheets

INTERMEDIATE SHAFT DASH PANEL SEAL

TECHNICAL FIELD

This invention relates generally to seals for a vehicle. In particular, this invention relates to a steering column intermediate shaft seal installed at the front of the panel of a vehicle.

BACKGROUND OF THE INVENTION

It is well known in the design and manufacture of vehicles to provide seals at locations where components pass through the passenger compartment dash panel. These seals typically partially support the weight and enhance the performance of certain components. These seals also serve to prevent the intrusion of dirt fumes and water into the passenger compartment and limit the transmission of noise and vibration from the component into the passenger compartment.

One type of dash mounted seal is the steering column intermediate shaft seal. A steering column intermediate shaft seal of the prior art is generally comprised of a single rubber casting and is installed within a hole in the dash panel and secured therein by an integrally molded locking feature. The seal of the prior art includes a single plastic bushing disposed therein for rotatably supporting an intermediate shaft of a steering column.

An intermediate shaft is typically mounted to other shafts comprising a steering column between a body mounted upper shaft and a chassis mounted steering gear and is routed through the dash mounted seal. The position of the steering gear in relation to the dash seal is typically different for different model vehicles and as such each vehicle model has a unique dash mounted seal. The seal prevents moisture and particle intrusion into the passenger compartment by employing compliable sealing features both at the intermediate shaft and at the dash opening. The sealing features, together with the compliant rubber material itself, also serve to reduce the amount of noise and vibration transmitted from the engine compartment to the passenger compartment. The bushing disposed within the seal and bellows features on the seal further provide low rotary friction support for the rotation of the intermediate shaft during operation of the steering column.

SUMMARY OF THE INVENTION

This invention offers advantages and alternatives over the prior art by providing a steering column intermediate shaft to dash panel seal which combines a high level of intrusion protection, low rotary friction, and a high level of noise abatement.

An intermediate shaft seal of the present invention includes a bushing assembly disposed within a compliant inner shell for rotatably supporting the intermediate shaft. The bushing assembly includes a pair of low friction bushings receiving the intermediate shaft and providing a low friction rotation surface and a seal.

The inner shell further includes an interface surface having sealing ridges and mounting holes for installation on studs protruding from the dash panel. Once installed the sealing ridges are compressed against the dash panel and provide a seal for intrusion protection against water, fumes and dirt. The sealing ridges further provide a measure of sound attenuation. The inner shell is covered by an overmold comprised of a compliant rubber material.

The inner shell and overmold have cooperating locking features molded therein. With the overmold installed on the inner shell an air gap is formed therebetween providing a high level of noise abatement. In addition, the inner shell and overmold have sinuous shaped sections which cooperate with each other to provide angular articulation of the seal for installation in various model vehicles.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
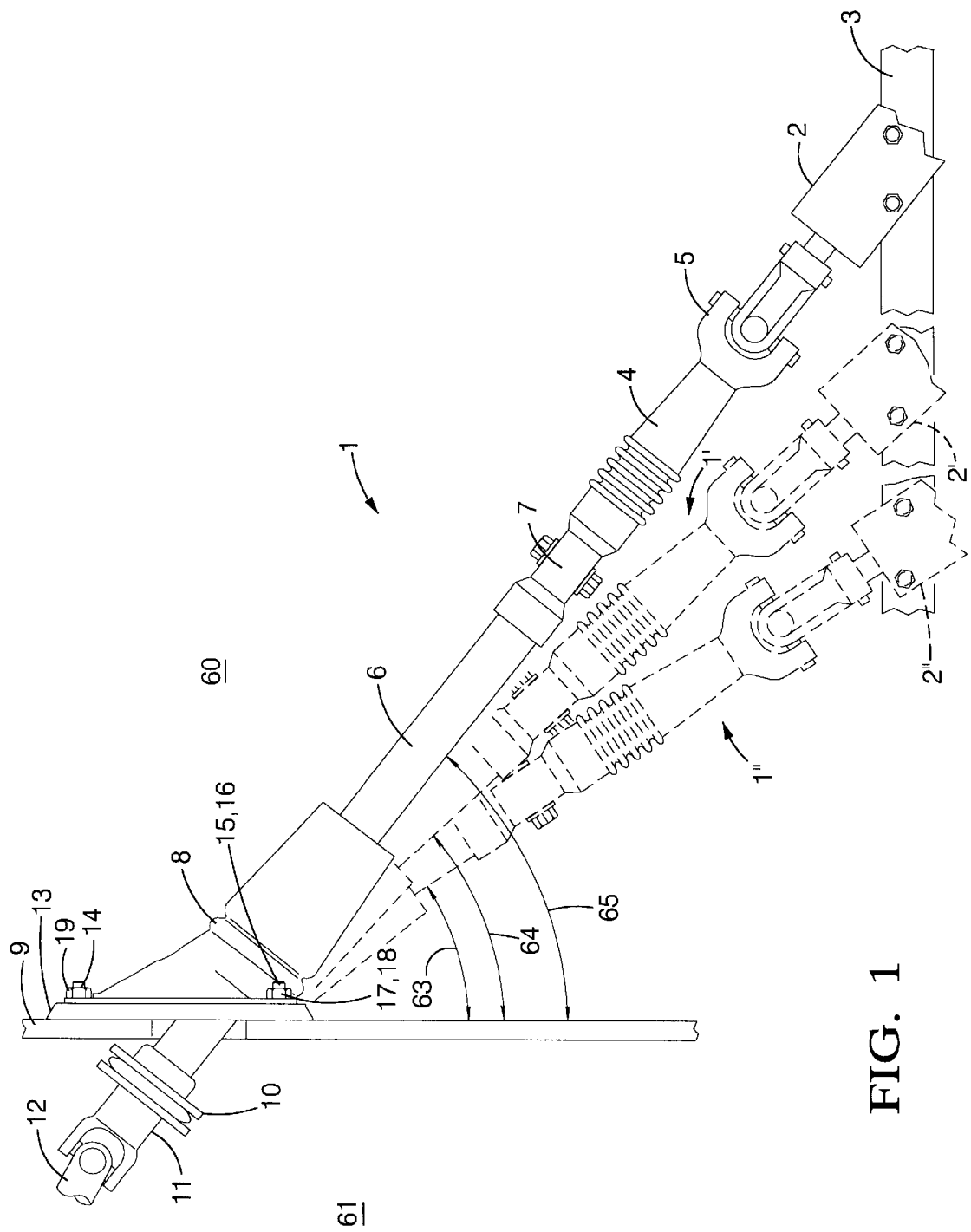
FIG. 1 is side plan view of a vehicle dash panel and frame in partial section showing a steering column assembly.

Referring to FIG. 1 there is shown a steering column assembly, generally designated as 1, including steering gear 2 mounted to frame 3 and connected to lower steering shaft 4 by lower universal joint 5. Intermediate shaft 6 is connected to lower shaft 4 by coupling 7 and passes through intermediate shaft dash seal 8 mounted to dash panel 9. Intermediate shaft 6 includes flex coupling 10 mounted to universal connector 11 and upper shaft 12 extending to a steering wheel (not shown). Intermediate shaft dash seal 8 is mounted to dash panel 9 at interface surface 13 on studs 14, 15, 16 and secured by nuts 17, 18, 19.

Figure 2:
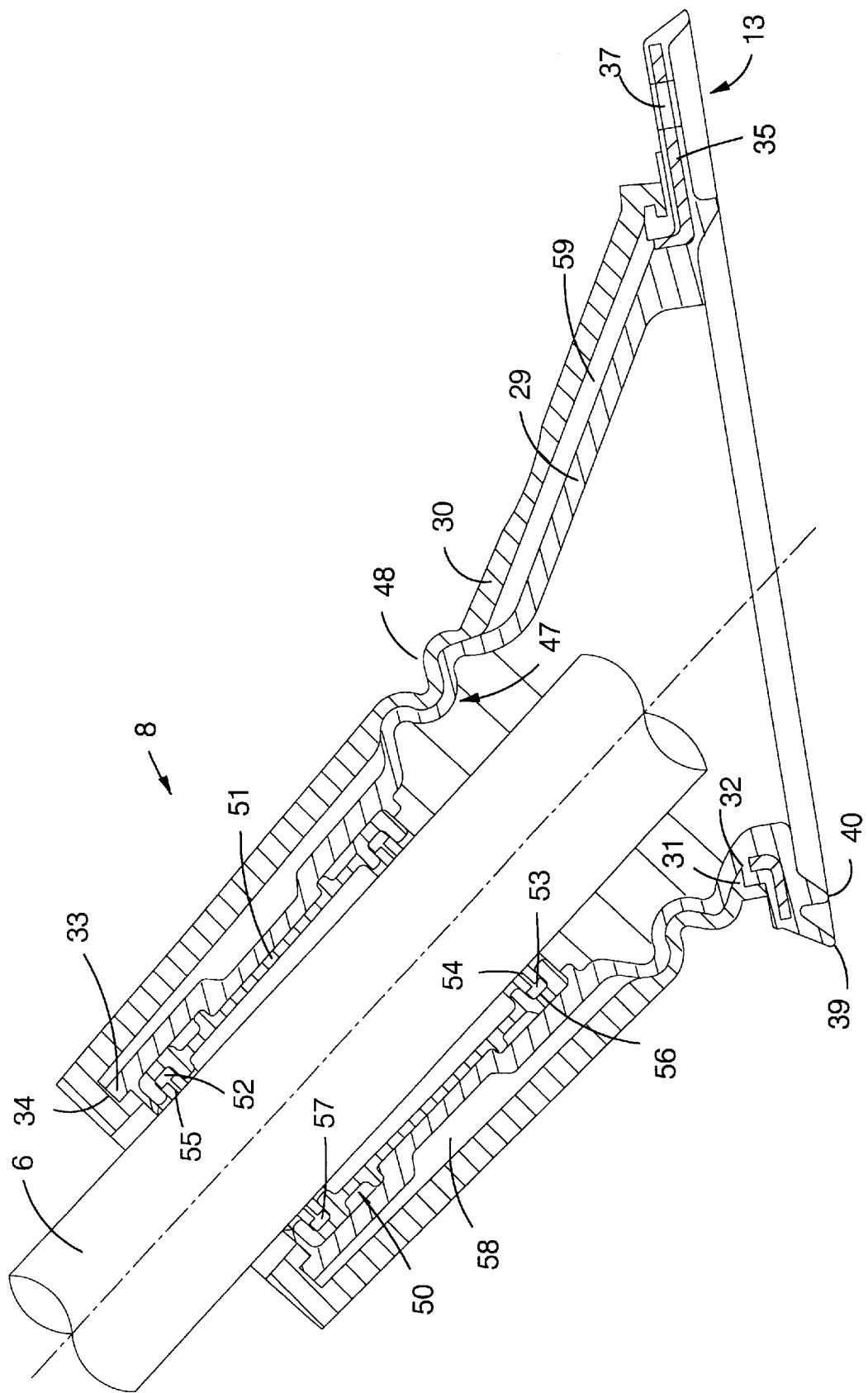
FIG. 2 is a cross sectional view of an intermediate shaft dash panel seal.
Figure 3:
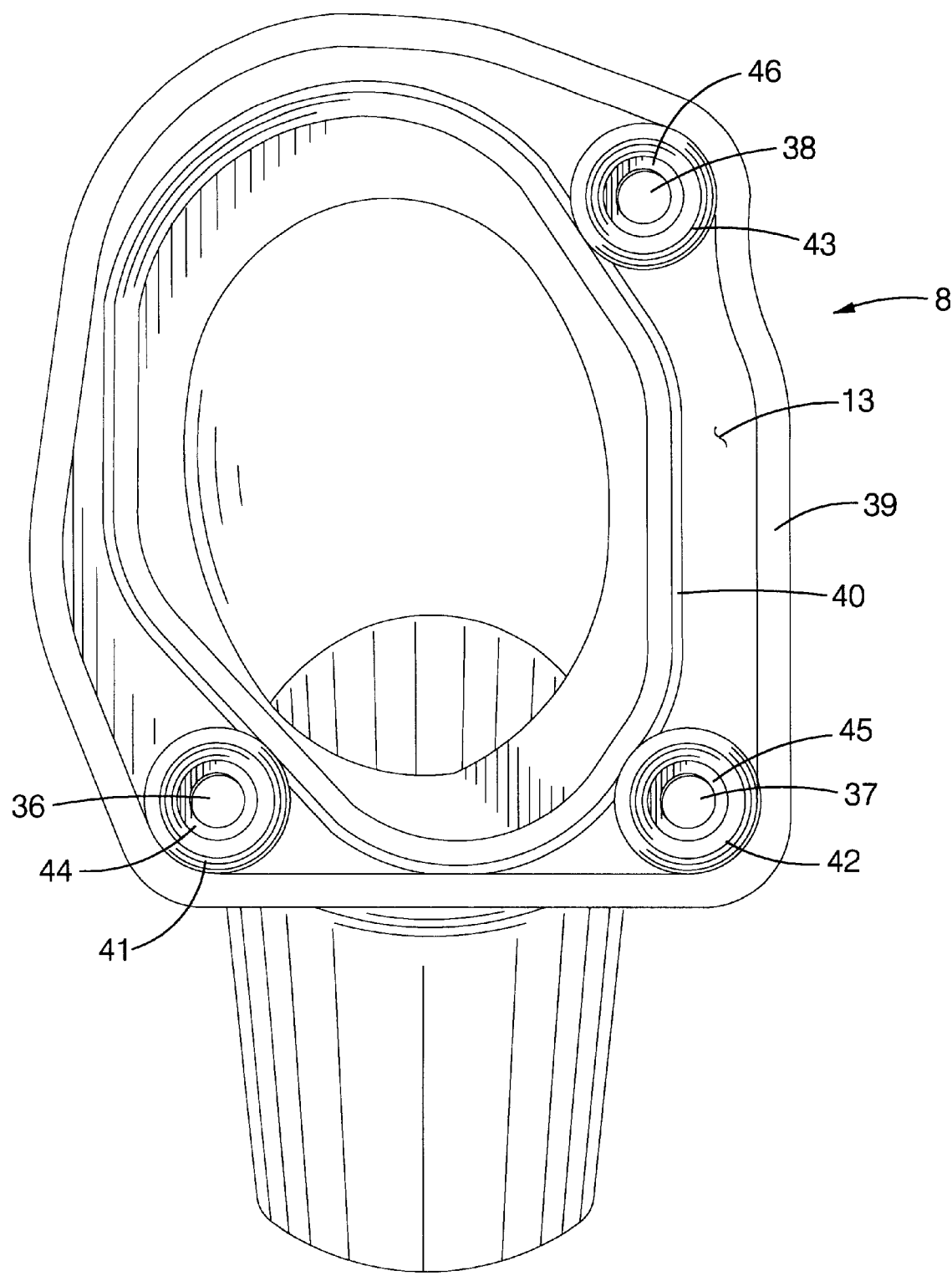
FIG. 3 is an isometric view of an intermediate shaft dash panel seal showing an interface surface and sealing features.

Referring to FIG. 2 inner shell 29 and overmold 30 of intermediate shaft seal 8 are generally comprised of a compliant rubber material. Locking blade 31 of overmold 30 engages locking groove 32 of inner shell 29 and annular tongue 33 of the inner shell engages annular groove 34 of the overmold to secure the inner and outer shells together. Inner shell 13 includes a rigid base plate 35, advantageously comprised of metal for example, integrally positioned therein providing a rigid mounting surface at interface surface 13, and includes mounting holes 36–38 as best shown in FIG. 3. Inner shell further includes integrally molded sealing ridges 39, 40 on interface surface 13 and sealing rings 41–43 located concentrically about access holes 44–46 and mounting holes 36–38. Inner shell 29 includes a sinuous shaped bellows 47 mating with a sinuous shaped bellows 48 positioned on overmold 30 as best shown in FIG. 2.

Intermediate shaft dash seal 8 further includes a bushing assembly, generally referred to as 50, and best shown in FIG. 2. Bushing assembly 50 includes bushing tube 51 advantageously comprised of a molded plastic material and having a pair of bushings 52, 53 disposed therein. Bushings 52, 53 are comprised of a low friction material and include bearing edges 54, 55 and are secured to bushing tube 51 at lands 56, 57 by a suitable adhesive as is known. In an embodiment of the present invention inner shell 29 is molded around bushing assembly 50, as well as base plate 35, encapsulating them therein.

Figure 4:
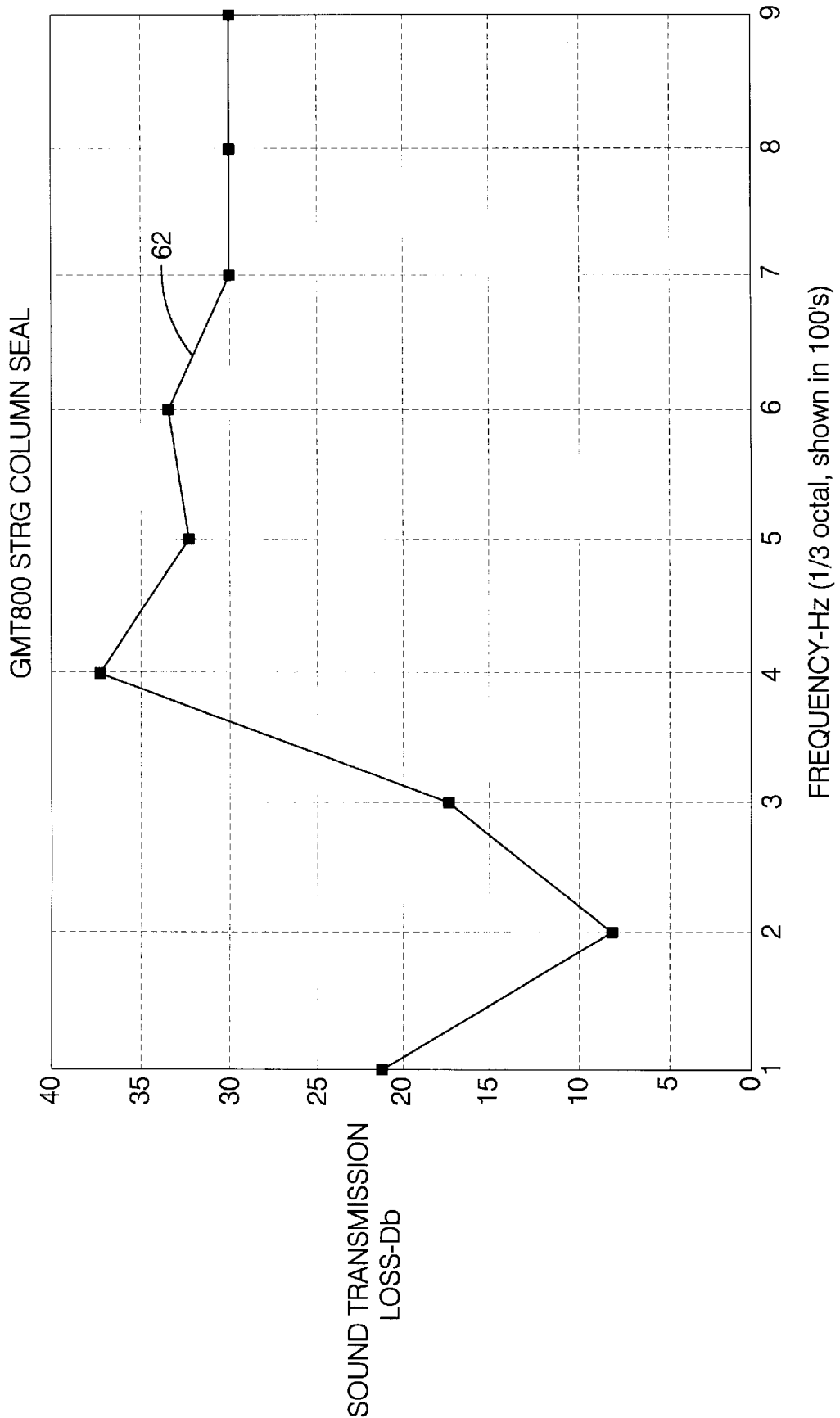
FIG. 4 is a graphical representation of the sound attenuation performance of an intermediate shaft seal in accordance with the present invention.

Noise is generated within an engine compartment side generally referred to as 60 in FIG. 1, of dash panel 9, and it is advantageous to attenuate the transmission of that noise to a passenger compartment side, generally referred to as 61. In an embodiment of the present invention overmold 30 functions together with air gaps 58, 59, and sealing ridges 39, 40 and sealing rings 41–43, as best shown in FIG. 2, to attenuate this noise transmission. In operation, sealing ridges 39, 40 and sealing rings 41–43 of intermediate shaft seal 8 are compressed against dash panel 9 by virtue of the clamping forces provided by nuts 17–19 threadably engaging the seal onto studs 14–16. Attenuation levels for an embodiment is shown, by way of example only, in FIG. 4 where sound transmission loss in Db on the vertical axis is plotted against certain frequencies in kHz, for a ⅓ octal, considered meaningful in the art and is represented by line 62. The sound attenuation, for the example shown, ranges from about 14 Db at 1 kHz to about 40 Db at 9 kHz.

It will be appreciated that, when compressed against dash panel 9, sealing ridges 39, 40 and sealing rings 41–43 of intermediate shaft seal 8 further function to prevent water, fumes and dirt intrusion from engine compartment side 60 to passenger compartment side 61. It will also be appreciated that mounting holes 36–38 engage studs 14–16 and with the addition of nuts 17–19 threadably engaged on the studs, seal 8 is quickly and easily installed and secured at dash panel 9. With seal 8 so mounted on dash panel 9 steering column assembly 1 components may subsequently be installed without the need for special tools or procedures.

In operation, intermediate shaft 6 is rotatably installed within intermediate shaft seal 8 as best shown in FIG. 2. Intermediate shaft 6 is supported by and rotates within bearing edges 54, 55 of bushings 52, 53. The low friction material comprising bushings 52, 53 provides a low noise, low rotation resistance surface to enhance the performance of steering column assembly 1. In addition, bearing edges 54, 55 advantageously provide a seal against intermediate shaft 6 to preclude water, fumes and dirt intrusion from engine compartment area 60 to passenger compartment area 61.

Another advantage of the present invention is the adaptability of a single intermediate shaft dash panel seal 8 configuration to several steering column assemblies 1, 1' and 1" as best shown in FIG. 1. As described hereinabove, steering gear 2 is mounted to frame 3 and steering column assembly 1 extends between the steering gear and dash panel 9. For a given vehicle (not shown) there may be several different models each having different frame 3, 3', 3" and steering gear 2', 2" locations relative to dash panel 9. The compliance of the material comprising inner shell 29 and overmold 30 combined with bellows 47, 48 forms a flexible portion allowing for the acceptance and axial alignment of intermediate shafts 1, 1', 1" within the same seal 8 by articulation through angles represented by lines 63–65. Shaft 6 remains aligned between dash panel opening 66 and steering gear 2. Shaft 6 further remains rotatably supported within bushing assembly 50 between angles 63 and 65 allowing for low noise and low friction rotation of steering column assemblies 1, 1', 1" while maintaining noise attenuation and intrusion resistance of the intermediate shaft seal 8.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An intermediate shaft dash panel seal for installation at an opening in a dash panel of a vehicle, the intermediate shaft dash panel seal comprising:

an inner shell having a flexible portion and an interface surface positioned at an end having at least one sealing ridge disposed thereon and having a plurality of mounting holes disposed therein;

an overmold disposed on an outside surface of the inner shell the overmold having a flexible portion cooperating with the flexible portion of the inner shell; and a bushing assembly disposed in the inner shell wherein the bushing assembly comprises:

a generally cylindrical bushing tube comprised of a rigid plastic material; and at least one bushing mounted within the bushing tube comprised of a material having a low coefficient of friction.

2. An intermediate shaft dash panel seal according to claim 1 wherein at least one bushing has a T-shaped cross section.

3. An intermediate shaft dash panel seal according to claim 1 wherein the bushing assembly is permanently positionable at a discrete angle relative to the dash panel within a relatively large range of angles.

4. An intermediate shaft dash panel seal for installation at an opening in a dash panel of a vehicle, the dash panel disposed between an engine compartment side and a passenger compartment side and having a plurality of threaded studs attached to the engine compartment side, the vehicle having a frame and a steering gear mounted thereto on the engine compartment side, a steering column including an intermediate shaft disposed between the steering gear and the passenger compartment side and extending through the intermediate shaft dash panel seal, the intermediate shaft dash panel seal comprising:

an inner shell having a first generally cylindrical portion and a second generally conical portion and a sinuous shaped section disposed therebetween, the first portion having an annular tongue disposed at a first end, the second portion having an interface surface positioned at a second end, the interface surface comprising at least one sealing ridge disposed thereon, the interface surface further having a locking groove and having a plurality of mounting holes;

an overmold disposed on an outside surface of the inner shell, the overmold having a groove disposed at a first end engaging the tongue of the inner shell, a locking blade disposed at a second end engaging the locking groove and a sinuous shaped section engaging the sinuous shaped section of the inner shell; and a bushing assembly disposed within the first portion of the inner shell, the bushing assembly comprising a generally cylindrical bushing tube having a pair of shaft bushings mounted therein receiving the intermediate shaft.

5. An intermediate shaft dash panel seal as set forth in claim 4 wherein the inner shell and overmold are comprised of a compliant rubber material.

6. An intermediate shaft dash panel seal as set forth in claim 4 wherein the mounting holes are disposed in a rigid baseplate disposed within the inner shell.

7. An intermediate shaft dash panel seal as set forth in claim 1 wherein the interface surface further comprising a sealing ring disposed at each of the mounting holes.

8. An intermediate shaft dash panel seal as set forth in claim 7 wherein the studs are disposed within the mounting holes and a nut is threadably engaged on each of the studs such that the sealing ridge or ridges and sealing rings of the intermediate shaft dash panel seal are compressed against the dash panel.

9. An intermediate shaft dash panel seal as set forth in claim 1 wherein the bushing tube is comprised of a rigid plastic material and the shaft bushings are comprised of a material having a low coefficient of friction.

10. An intermediate shaft dash panel seal as set forth in claim 1 wherein a first air gap is formed between the inner shell and the overmold at the first cylindrical portion and a second air gap is formed between the inner shell and the overmold at the second cylindrical portion.

11. An intermediate shaft dash panel seal as set forth in claim 1 wherein the studs are disposed within the mounting holes and a nut is threadably engaged on each of the studs such that the sealing ridge or ridges of the intermediate shaft dash panel seal are compressed against the engine compartment side of the dash panel.

12. An intermediate shaft dash panel seal as set forth in claim 1 wherein the shaft bushings and the sealing ridge or ridges and sealing rings of the intermediate shaft dash panel seal are compressed against the dash panel.

13. An intermediate shaft dash panel seat as set forth in claim 1 wherein the sinuous section[s] of the inner shell allows for an axial alignment of the intermediate shaft between the opening and the steering gear.

14. A shaft seal comprising:

a bushing tube having a first end and a second end;

a first bushing carried in a first groove inside the bushing tube near the first end;

a second bushing carried in a second groove inside the bushing tube near the second end;

an inner shell overlying the bushing tube, the inner shell having a generally cylindrical portion carrying the bushing tube and a generally conical section extending past the second end of the bushing tube and flaring outwardly and away from the bushing tube, the inner shell having an annular tongue extending past the first end of the bushing tube; and an overmold having a generally cylindrical section that lies radially outside the generally cylindrical portion of the inner shell and that terminates at an annular groove section that receives the annular tongue, the overmold having a generally cylindrical section that lies radially outside the generally cylindrical portion of the inner shell.

15. A shaft seal according to claim 14 wherein the inner shell has a sinuous shaped portion extending between the generally cylindrical portion and the generally conical portion and the overmold has a sinuous shaped section extending between the generally cylindrical section and the generally conical section, wherein the sinuous shaped portion mates with the sinuous shaped section separating a first air gap located between the generally cylindrical portion and the generally cylindrical section from a second air gap located between the generally conical portion and the generally conical section.

* * * * *